(12) United States Patent
Schreiber et al.

(10) Patent No.: US 11,619,292 B2
(45) Date of Patent: Apr. 4, 2023

(54) GEARING

(71) Applicant: WITTENSTEIN SE, Igersheim (DE)

(72) Inventors: Heiko Schreiber, Doberschau (DE);
Andreas Kümmeth, Ochsenfurt (DE);
Tobias Röthlingshöfer, Würzburg (DE)

(73) Assignee: WITTENSTEIN SE, Igersheim (DE)

( * ) Notice: Subject to any disclaimer, the term of this patent is extended or adjusted under 35 U.S.C. 154(b) by 87 days.

(21) Appl. No.: 17/089,094

(22) Filed: Nov. 4, 2020

(65) Prior Publication Data

US 2021/0131546 A1    May 6, 2021

(51) Int. Cl.
F16H 49/00    (2006.01)

(52) U.S. Cl.
CPC ..... *F16H 49/001* (2013.01); *F16H 2049/003* (2013.01)

(58) Field of Classification Search
CPC .................. F16H 49/001; F16H 2049/003
USPC .......................................................... 74/640
See application file for complete search history.

(56) References Cited

U.S. PATENT DOCUMENTS

| | | | |
|---|---|---|---|
| 5,044,219 A | | 9/1991 | Braunschweiler |
| 8,656,809 B2 * | | 2/2014 | Bayer ................ F16H 25/06 475/167 |
| 9,228,651 B2 * | | 1/2016 | Waide ................ F16H 49/001 |
| 9,470,301 B2 * | | 10/2016 | Kuo .................... F16H 49/001 |
| 10,267,404 B2 * | | 4/2019 | Schreiber .......... F16H 49/001 |
| 10,830,328 B2 * | | 11/2020 | Schreiber .......... F16H 25/06 |
| 2009/0205451 A1 | | 8/2009 | Bayer et al. |
| 2010/0024593 A1 * | | 2/2010 | Schmidt ............ F16H 25/06 74/640 |
| 2010/0077882 A1 * | | 4/2010 | Schreiber .......... F16H 25/06 74/462 |
| 2016/0298747 A1 | | 10/2016 | Schreiber et al. |
| 2016/0298748 A1 | | 10/2016 | Schreiber et al. |

FOREIGN PATENT DOCUMENTS

| | | |
|---|---|---|
| CH | 262 054 A | 6/1949 |
| DE | 10 2006 042 786 A1 | 3/2008 |
| DE | 10 2006 042786 A1 | 3/2008 |
| DE | 10 2007 011 175 A1 | 9/2008 |

(Continued)

OTHER PUBLICATIONS

Search Report for German Application No. 102019129667.6 dated May 6, 2020.

(Continued)

*Primary Examiner* — Ha Dinh Ho
(74) *Attorney, Agent, or Firm* — Meunier Carlin & Curfman LLC

(57) ABSTRACT

A gearing, in particular a coaxial gearing or a linear gearing, comprising a tooth system, a tooth carrier having guides, teeth received within the guides for engagement with the tooth system, wherein the teeth are mounted within the guides to be displaceable in the direction of their longitudinal axis relative to the tooth carrier, a cam disk for driving the teeth along the respective longitudinal axis of the teeth, wherein at least one of the teeth respectively has a tooth flank area having tooth flanks, and a tooth body, wherein, between the tooth body and the tooth flanks, one shoulder respectively is provided, which projects back from the tooth body to the inside towards the tooth flank.

14 Claims, 2 Drawing Sheets

(56) References Cited

FOREIGN PATENT DOCUMENTS

| DE | 10 2012 104 083 A1 | 11/2013 |
| DE | 10 2012 104083 A1 | 11/2013 |
| DE | 10 2015 105 523 A1 | 10/2016 |
| DE | 10 2015 105 524 A1 | 10/2016 |
| DE | 10 2015 105524 A1 | 10/2016 |
| EP | 0 396 978 A1 | 11/1990 |

OTHER PUBLICATIONS

Extended European Search Report in connection to EP Application No. 20205252.8, dated Apr. 30, 2021.

* cited by examiner

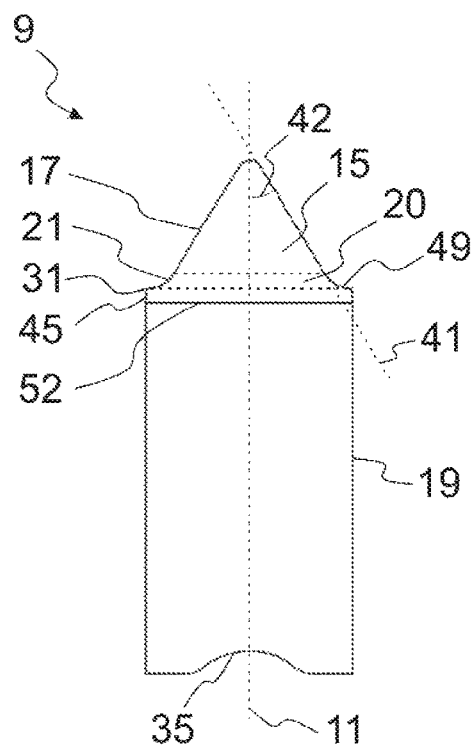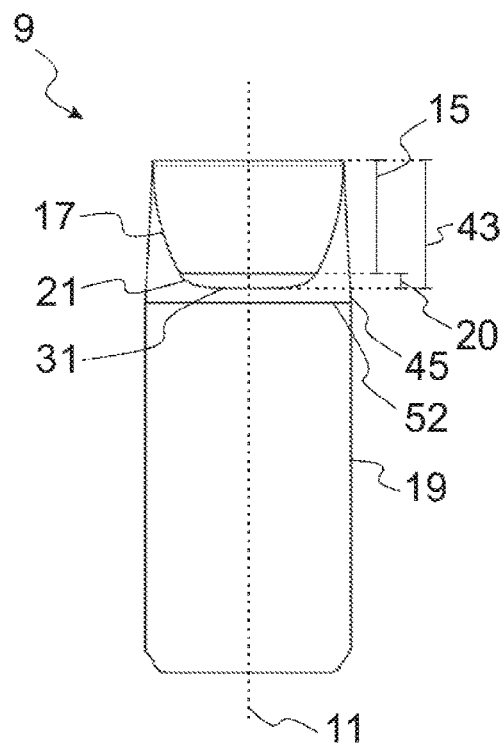
Fig. 2
Fig. 3
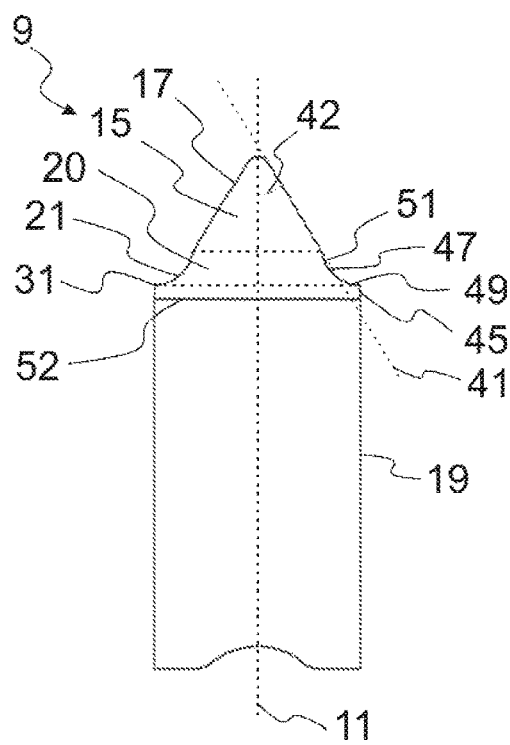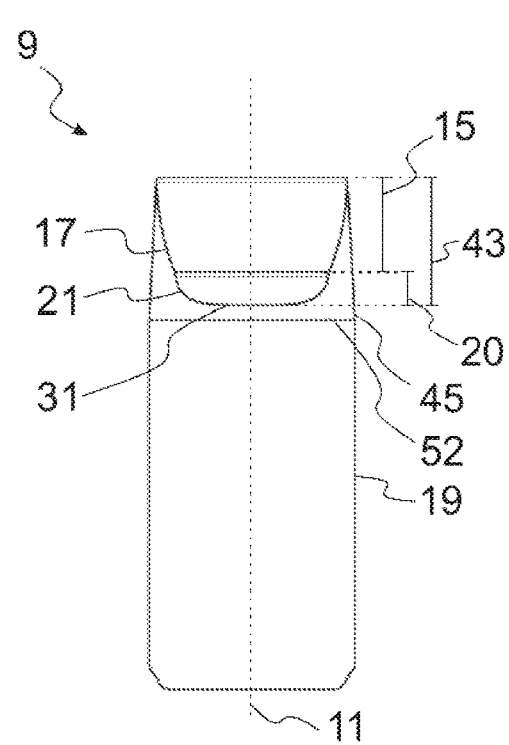
Fig. 4
Fig. 5

GEARING

CROSS REFERENCE TO RELATED APPLICATION

This application claims priority to and benefit of German patent application DE 102019129667.6 filed Nov. 4, 2019, which is fully incorporated by reference and made a part hereto.

FIELD OF THE INVENTION

The invention relates to a gearing and a use of a gearing and a tooth for a gearing.

STATE OF THE ART

From the state of the art, gearings are known comprising teeth, which are mounted radially displaceable in a tooth carrier. For driving the teeth, driving elements having a profiling such as, for example, cam disks are used. The teeth engage into a tooth system, so that a relative movement between the tooth carrier having the teeth and the tooth system takes place. The relative movement between the tooth system and the teeth is thereby at least by one magnitude less than the movement of the driving element having the profiling. In this way, high transmissions may be achieved, an example of such a gearing being published in DE 10 2007 011 175 A1.

A critical point of these gearings is the mounting of the teeth in the tooth carrier. During force transmission from one tooth to the tooth carrier, which may represent the output, contact forces arise between the tooth and the tooth carrier. This entails a heat development and possibly a material abrasion due to the movement of the teeth. Both circumstances can be undesired in operation.

DISCLOSURE OF THE INVENTION

A task of the invention is to propose a gearing or a tooth, which are improved with respect to gearings known from the state of the art, wherein a reduced heat development or a reduced wear in the area of the tooth guide is intended to be achieved. Furthermore, it is a task of the invention to propose a use of such a gearing.

The task is solved by a gearing according to claim 1 and a use according to the coordinate claim. Advantageous further developments and embodiments will result from the dependent claims and from this description.

One aspect of the invention relates to a gearing, in particular a coaxial gearing, having a tooth system, a tooth carrier having guides, teeth, which are received within the guides for engagement with the tooth system, wherein the teeth are mounted to be displaceable in the guides in the direction of their longitudinal axis relative to the tooth carrier, a cam disk for driving the teeth along the respective longitudinal axis of the teeth, wherein at least one of the teeth respectively has a tooth flank area including tooth flanks, and a tooth body, wherein between the tooth body and the tooth flanks, in each case a shoulder is provided projecting back towards the inside from the tooth body to the tooth flank.

A further aspect of the invention relates to a use of a gearing in one of the typical embodiments described herein.

A further aspect of the invention relates to a tooth for a gearing in one of the typical embodiments described herein, wherein the tooth has a tooth flank area including tooth flanks, and a tooth body, wherein, between the tooth body and the tooth flanks, in each case a shoulder is provided projecting back towards the inside from the tooth body to the tooth flank.

Typically, the shoulder of a tooth is arranged in a shoulder area of the tooth. Typically, the shoulder area is arranged between the tooth flank area of the tooth and the tooth body of the tooth. Typically, the shoulder area and the tooth flank area together form a tooth head of the tooth. In particular, the tooth flank area herein comprises that area of the tooth along the longitudinal axis of the tooth, where the tooth flanks of the tooth and a tooth tip of the tooth are arranged.

Embodiments of the invention relate in particular to coaxial gearings. Usually, gearings of the invention comprise an inner cam disk having a profiling as a driving element, and a hollow wheel having an inner tooth system, or an outer driving element having an inner profiling, and an inner gearwheel or an inner gearing rack, which in the case of the outer driving element constitutes the tooth system. Configurations of embodiments relate to linear gearings for converting a rotation into a linear movement. The tooth system typically is a circumferential tooth system. The teeth or the tooth heads of the teeth engage into the tooth system, wherein the teeth typically are mounted to be radially or axially displaceable relative to the tooth carrier.

In typical embodiments, the guides of the tooth carrier are radially oriented with respect to the rotational axis of the cam disk. Typically, the teeth are mounted in the guides of the tooth carrier to be radially displaceable with respect to the rotational axis of the cam disk. Typically, the teeth are mounted to be linearly radial relative to the tooth carrier. In this case "linearly radial" usually means that there is a guidance in the radial direction, which permits a movement of the tooth merely in the radial direction and in particular a tilting of the tooth within the scope of the guidance tolerance.

In further typical embodiments, the guides of the tooth carrier are axially oriented with respect to the rotational axis of the cam disk. Typically, the teeth are mounted in the guides of the tooth carrier to be axially displaceable with respect to the rotational axis of the cam disk. Typically, the teeth are mounted to be linearly axial relative to the tooth carrier. Usually, "linearly axial" means that there is a guidance in the axial direction, which permits a movement of the tooth merely in the axial direction.

Typically, the teeth each are mounted within the tooth carrier to be displaceable in just one direction, typically in the direction of the longitudinal axis of the tooth. This may be achieved, for example, in that the tooth has a constant cross-section in the direction of displacement over a certain length, in particular over a certain length along the longitudinal axis of the tooth, wherein the guide for the tooth is configured within the tooth carrier as a slot or opening having a constant cross-section.

In typical embodiments of the gearings according to the invention, at least a part of the teeth is configured to be flexurally rigid. The term "flexurally rigid" should in this case be typically understood technically, that means, bending deformations of the teeth are so small due to the rigidity of the material of the teeth that they are at least substantially unimportant for the kinematics of the gearing. Flexurally rigid teeth comprise in particular teeth made of a metal alloy, in particular steel, or a titanium alloy, a nickel alloy or any other alloys. Furthermore, flexurally rigid teeth of plastics may also be provided, in particular in gearings, in which also at least one of the following parts is made of plastics: the tooth system on a hollow wheel or a toothed wheel, the tooth carrier and the driving element. In typical embodiments of the invention, the tooth carrier and the teeth are made of a metal alloy, or in addition the tooth system or further additionally the driving element are made of a metal alloy. Such gearings offer the advantage that they are extremely torsionally rigid and withstand high loads. Gearings of plastics offer the advantage that they have a low weight. The term "flexurally rigid" means in particular a flexural rigidity about a transverse axis of the tooth. This means in particular, that when the tooth is viewed as a rod from a tooth base to a tooth flank area, a flexural rigidity is given at least substantially excluding bending deformations between the tooth flank area and the tooth base. Due to the flexural rigidity, a very high resistance to load and torsional rigidity of the gearing are achieved.

In typical embodiments, a swivel segment is arranged between the tooth and the profiling, which is mounted on a rolling bearing, which in turn rests upon the profiling. Typically, the tooth is loosely connected to the swivel element. In this case, "lose connection" preferably means, that the tooth segment is merely placed, usually directly placed, upon the swivel segment. Preferred swivel segments comprise a profile which prevents the tooth from slipping off the swivel segment or the swivel segment from slipping out of place at least in one direction. Such a profile, for example, may be a bead engaging into a recess on the tooth base of the tooth. Reference is made to DE 10 2015 105 523 A1 for a possible embodiment of a swivel segment.

Typical tooth carriers comprise guides each having a tooth base opening and a tooth head opening. Typically, the tooth base opening is oriented toward the cam disk, and the tooth head opening is oriented toward the tooth system. This enables the teeth to be received such that the teeth are mounted to be displaceable within the guide along their respective longitudinal axes. The longitudinal axis of a tooth typically extends from a tooth base of the tooth to the tooth flank area of the tooth. The teeth with their respective tooth bases are mounted on swivel segments, which in turn are mounted on the cam disk via rolling bodies. In typical embodiments, the tooth carrier is circular or annular. Typical guides for the teeth in the tooth carrier are formed as through openings or through bores. Further typical tooth carriers comprise rectangular milled cuts or oblong holes or slots as guides. The teeth are typically received within the tooth carrier so that the tooth head projects out from the tooth head opening or can be pushed out from the tooth head opening, and the tooth base projects out from the tooth base opening. By driving the cam disk having the profiling, a force can be exerted upon the teeth in the direction of the respective longitudinal axis of the teeth via the rolling bodies and the swivel segments, so that the teeth are pressed out from the guides on the tooth head side.

The tooth system and the teeth typically have curved flanks. Examples of curvatures of the flanks are a cylindrical curvature, a curvature of the flanks along a helix or a helical surface around the rotational axis of the coaxial gearing, or a curvature in the form of a logarithmic spiral. For a possible embodiment of a curvature in the form of a logarithmic spiral, reference is made to DE 10 2007 011 175 A1. The curved surface offers the advantage that the flanks being in engagement fit flatly and not only in a line form or point form. In this way, an extreme rigidity is achieved in the force transmission between the tooth system and the teeth. "Flanks" herein should in particular be understood as the tooth flanks of the teeth or flanks of the tooth system.

In typical embodiments, a tooth head of a tooth has a tooth flank area along the longitudinal axis of the tooth including tooth flanks. Typically, the tooth comprises a tooth base in an end portion of the tooth opposite a tooth head. The tooth base typically has a recess for mounting the tooth on a profile of a swivel segment.

In typical embodiments, the tooth comprises a shoulder area and a tooth body between the tooth flank area and the tooth base. The tooth body extends along the longitudinal axis of the tooth over a body length. Apart from lubricating channels or similar, the tooth body at least substantially has a constant cross-section over the body length. Typically, the tooth body is configured to be at least substantially cylindrical.

For example, forces between a tooth and a tooth carrier may be transmitted via a tooth guiding contact, in particular via a tooth guiding contact between the tooth body and the guide of the tooth. In particular, the body length of a typical tooth having a shoulder may be extended as compared to a body length of a tooth without a shoulder known from the state of the art. The tooth flank area along the longitudinal axis of the tooth, for example, may be shortened as compared to a tooth known from the state of the art, in particular without changing an entire length of the tooth as compared to the tooth known from the state of the art. By extending the body length, for example, the outer tooth guiding contact may be displaced further toward the tooth system. This may result in an improved lever action at lower contact forces on the tooth guiding contact or during supporting forces between the tooth and the tooth carrier.

In typical embodiments, the tooth is configured as a flat tooth or a round tooth. Flat teeth are typically guided in guides having a non-circular cross-section in the tooth carrier. In typical embodiments, the tooth has, for example, in the axial direction of the gearing, a width which is at least twice as large as the thickness, for example, in the circumferential direction of the gearing. Further embodiments comprise circular or oval teeth or circular teeth having flattenings.

In typical embodiments, the tooth comprises—between the tooth flanks of the tooth flank area and the tooth body—a shoulder projecting back towards the inside from the tooth body to the tooth flank, in particular towards the inside to the longitudinal axis of the tooth. The shoulder is in particular provided in a shoulder area between the tooth flanks and the tooth body. The shoulder, for example, is formed to be rounded or having a radius towards the inside, in particular towards the inside to the longitudinal axis of the tooth. In further typical embodiments, the shoulder is configured as a ledge or step. In particular, the shoulder may be configured to be angular towards the inside in the direction of the longitudinal axis.

Typically, an outer tooth surface of the tooth is at least in part formed by the shoulder in the shoulder area of the tooth. In particular, the shape of the outer tooth surface between two tooth flanks and the tooth body of the tooth is predefined by a respective shoulder. The outer tooth surface of the tooth may comprise surfaces in the shoulder area or in the tooth flank area, which have another shape than a shoulder or a tooth flank, for example, partial surfaces of a conical base body or a cylindrical base body. In embodiments, the outer contour of a tooth head extends in an area where tooth flanks or a shoulder are not formed, along a conical or cylindrical base body.

In typical embodiments, the tooth flanks each enclose a flank angle with the longitudinal axis. The flank angle typically is at least 15°, in particular at least 20° or at least 25°, or a maximum of 45°, in particular a maximum of 40° or a maximum of 35°. In this context, a tooth flank should be understood in particular as a surface of the tooth flank area, which surface can come into contact with the tooth system, or can carry a load, for example, a surface load from the contact of the tooth with the tooth system. The flank angle should be in particular understood as an angle enclosing a flank line of the tooth flank in a section plane of the tooth with the longitudinal axis of the tooth, wherein the section plane of the tooth extends along the longitudinal axis and perpendicular to the tooth flank. The flank line in the section plane, for example, may correspond to a medial tangent to the tooth flank or a tangent to the tooth flank in the middle of the tooth flank, or a secant through the end points of the tooth flank in the section plane.

Typically, a shoulder is rounded to be concave, Typically, the shoulder has a retraction with respect to the tooth flank. In typical embodiments, the shoulder, in particular the retraction of the shoulder, is rounded to be concave at the transition to a tooth flank. In particular, the retraction of the shoulder is rounded towards the inside with respect to a flank line of the tooth flanks. In particular, during a tooth system engagement, the tooth does not come into contact with the tooth system at the retraction of the shoulder. In particular, the tooth does not carry any load of the tooth system at the retraction of the shoulder. An advantage of the retraction of the shoulder with respect to the tooth flank may be that splash losses in the contact of the tooth with the tooth system may be reduced. The tooth flank may in particular be reduced by the retraction, whereby lubricating oil needs to be displaced from a smaller surface.

Typically, in a section plane of the tooth along the longitudinal axis and perpendicular to the tooth flank, the shoulder, in a first point, in particular in a first point at the transition to the tooth body, is more inclined to the longitudinal axis of the tooth than the tooth flank. For example, the inclination of the shoulder to the longitudinal axis in the first point is larger than the flank angle of the tooth flank, in particular is larger by at least 5° or at least 10°.

In typical embodiments, in a section plane of the tooth along the longitudinal axis and perpendicular to the tooth flank, the shoulder, in a second point, in particular in a second point at the transition to the tooth body, is less inclined to the longitudinal axis of the tooth than the tooth flank. For example, the inclination of the shoulder to the longitudinal axis in the second point is smaller than the flank angle, in particular is smaller by at least 3° or at least 5°. The shoulder may in particular have a first point and a second point.

In typical embodiments, in a section plane extending along the longitudinal axis of the tooth and perpendicular to the tooth flanks, a tangent intersects a volume of the tooth body on one of the tooth flanks. In particular, the tangent intersects the volume of the tooth body and a volume of the shoulder area of the tooth. Typically, the volume of the tooth body is intersected by a flank surface into at least two partial volumes, wherein the flank surface extends along the flank line and perpendicular to the section plane.

In typical embodiments, a tooth head of the tooth, in particular the tooth flank area and the shoulder commonly, has/have an axial length, which is larger than a depth of a tooth gap of the tooth system. "Axial length" of the tooth head should in particular be understood as the common length of the tooth flank area and the shoulder with respect to the longitudinal axis of the tooth. In a gearing having radially oriented guides, the depth of the tooth gap should in particular be understood as the difference of a radial maximum and a radial minimum of the tooth system. In a gearing having axially oriented guides, the depth of the tooth gap should in particular be understood as the difference of an axial maximum and an axial minimum of the tooth system. In exemplary embodiments, the axial length of the tooth flank area and the shoulder may be smaller than 1.2 times the depth of the tooth gap, in particular smaller than 1.1 times or 1.05 times the depth of the tooth gap. In further exemplary embodiments, during a complete engagement of the tooth flank area into the tooth system, an outer edge of the shoulder, at the border between the tooth body and the shoulder, may have a distance in the axial direction of the tooth to a toothing head of the tooth system of a maximum of 0.1 times, for example, 0.05 times the depth of a tooth gap of the tooth system.

In typical embodiments, the tooth body has a cone in an inlet area that is in particular adjacent to the shoulder, wherein a tangent to the outer circumference of the cone encloses a cone angle of a maximum of 2°, in particular of a maximum of 1° or of a maximum of 0.5° with the longitudinal axis of the tooth. Typical cone angles of the cone of the tooth are at least at 0.05° or at least 0.1° or at least at 0.2°. The cone may extend partially from the tooth body into the shoulder area or into the tooth flank area, in particular up to a tooth tip of the tooth, for example, on outer tooth surfaces, which are not formed as a shoulder or as tooth flanks. Chamfers in the inlet area are also comprised by the term "cone", in particular chamfers attached to flat teeth. Typical inlet areas may be flat and may have a chamfer. Typically, a transition between the cone of the tooth and the tooth body is configured to be convex. This enables the tooth to gently slide along in the guide: Typically, the tooth is received within the guide of the tooth carrier such that during a maximum radial or axial stroke of a tooth towards the tooth system, the cone of the tooth projects out from the guide. In further embodiments, the cone remains at least in part within the guide.

Typically, the surface of the tooth at the shoulder is machined differently from the tooth flanks. In particular, the surface of the tooth at the shoulder is less finely machined than the tooth flanks. For example, the shoulder may be less finely machined already during the manufacture of the tooth. In particular, the less surfaces need to be finely machined, the larger the shoulder or the shoulder area is configured, in which the shoulder is provided.

Typical embodiments of the gearing as compared to the state of the art may offer the advantage that the gearing has a better lever action in supporting tooth forces between the teeth and the tooth carrier. The gearing in particular may have a higher load capacity or less wear or a longer lifetime. A further advantage of typical gearings may be that the manufacture of the teeth or the gearing is simplified. For example, the shoulder of the tooth may be machined less finely or substantially less precisely than the tooth flanks of the tooth. A tooth may in particular be manufactured more rapidly or more cost-efficiently. Typical gearings may offer the further advantage that splash losses in the tooth system contact can be reduced. For example, typical gearings have smaller tooth flanks, whereby lubricating oil needs to be displaced from a smaller surface.

BRIEF DESCRIPTION OF THE DRAWINGS

Hereinafter, the invention will be explained in more detail by means of the attached drawings, wherein the Figures show:

FIG. 2 a tooth of a typical embodiments in a schematic view;

FIG. 3 the tooth of FIG. 2 in a side view;

FIG. 4 a tooth of a further typical embodiment in a schematic view; and

FIG. 5 the tooth of FIG. 4 in a side view.

DESCRIPTION OF EXEMPLARY EMBODIMENTS

Figure 1:
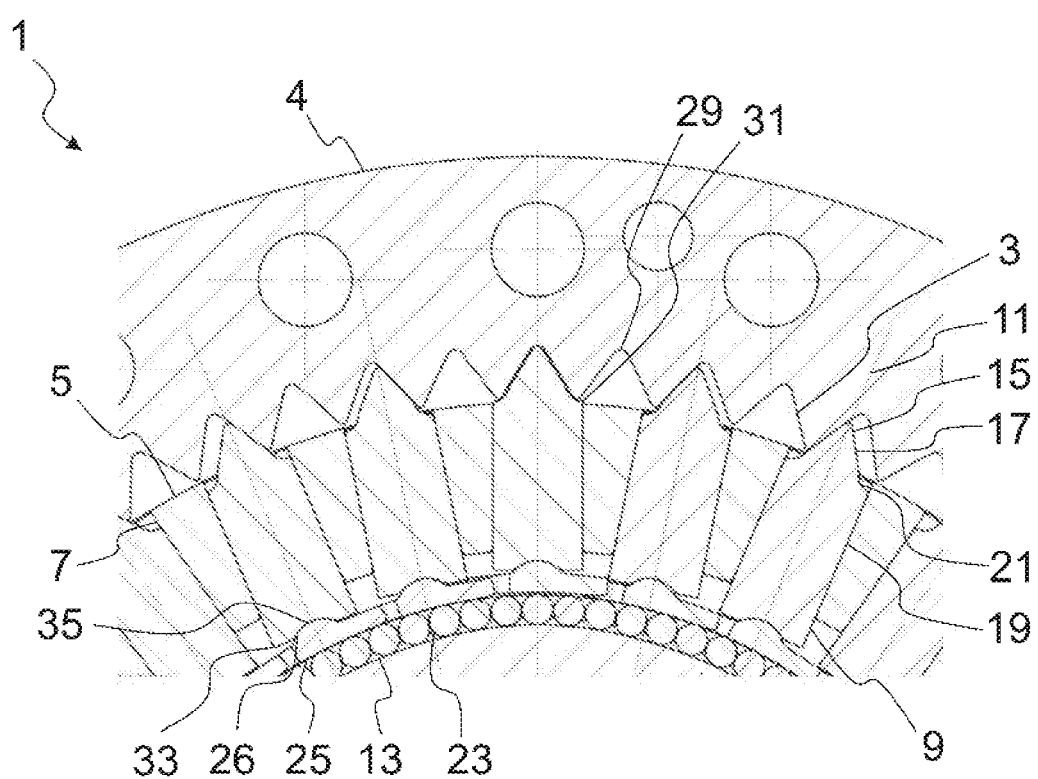
FIG. 1 a cutout of a typical embodiment of the invention in a schematic sectional view.

Hereinafter, typical embodiments of the invention will be described by means of the Figures, wherein the invention is not restricted to the exemplary embodiments, the scope of the invention is rather defined by the claims. In the description of the exemplary embodiments, in different Figures and for different embodiments, identical reference numerals are possibly used for identical or similar parts. Partially, features which had been described already in conjunction with other Figures, will not be described again for reasons of clarity. For clarity, it may be the case that not all of the respective features, for example, the teeth, are provided with a reference numeral (reference numeral 9 in FIG. 1).

In FIG. 1, a cutout of a typical embodiment of the invention is illustrated in a schematic sectional view. FIG. 1 shows a gearing 1 having teeth 9 received to be displaceable within guides 7 of a tooth carrier 5. The tooth carrier 5 is arranged between a tooth system 3 of a hollow wheel 4 and a cam disk 13. In FIG. 1, the guides 7 are radially oriented, and the teeth 9 are linearly mounted in the guides 7 to be radially displaceable. In particular, the teeth 9 are displaceable along their respective longitudinal axis 11. The teeth 9 may be displaced radially for engagement with a tooth system 3 of the hollow wheel 4.

In the gearing 1 of FIG. 1, the cam disk 13 serves as a driving element of the gearing 1. The cam disk 13 has a profiling in the circumferential direction of the cam disk 13. The profiling has a development including two elevations over the circumference so that opposite teeth 9 respectively engage furthest and equally deep into tooth gaps 29 of the tooth system 3. In further embodiments, the cam disk has three elevations, and in still further embodiments, the cam disk has only one elevation or more than three elevations in further embodiments.

In the exemplary embodiment of FIG. 1, the rotational axis of the cam disk 13 extends perpendicular to the illustration plane of FIG. 1. Relative to the rotational axis of the cam disk 13, the cam disk 13 is arranged radially inside the teeth 9, and the tooth system 3 of the hollow wheel 4 is arranged radially outside the teeth 9 relative to the rotational axis of the cam disk 13. In such a configuration, the output is drawn from the hollow wheel 4 having the tooth system 3 or from the tooth carrier 5, wherein the respective other element is fixed. In further embodiments, the driving element is arranged outside, i.e. outside the tooth carrier, and the tooth system is arranged inside. It is again possible to draw the output from the inner tooth system or from the tooth carrier. The tooth carrier having its openings may also be designated as a tooth cage, in which teeth are received to be displaceably guided in a radially linear manner.

The gearing 1 comprises a segmented bearing for the teeth 9. The segmented bearing comprises swivel segments 25 each having a round tooth bearing surface 26 on the side facing the tooth 9, which round tooth bearing surface forms a bead, on which a tooth base 33 of a tooth 9 or, in typical embodiments, two, three or four teeth may be arranged side by side in the axial direction of the gearing 1. Together with a corresponding recess 35 in the tooth base 33 of the respective tooth 9, the bead prevents the tooth 9 from slipping out of place on the swivel segment 25.

By the beads, tooth base joints for the teeth 9 are formed so that the swivel segments 25 can tilt relative to the teeth 9 in order to guarantee an unrestrained guidance. The swivel segments 25 are mutually movable in the radial direction, so that the distances between the swivel segments 25 can be modified. This enables a largely unrestrained guidance and a largely unrestrained drive of the swivel segments 25 by the profiling of the cam disk 13. For minimizing the frictional resistance between the profiling and the swivel segments 25, the rolling bodies 23 are provided as needle rollers. In further embodiments, balls or other rolling bearings are provided for the bearing of swivel segments.

In FIG. 1, a tooth 9 comprises a tooth flank area 15 having tooth flanks 17 and a tooth tip of the tooth 9, wherein the tooth flank area 15 is arranged in a tooth head of the tooth 9 facing the tooth system 3 of the hollow wheel 4. The tooth 9 comprises a tooth base 33 in an end area of the tooth 9 facing the cam disk 13, a tooth body 19 adjacent to the tooth base 33, and a shoulder 21 arranged between the tooth body 19 and the tooth flank area 15, in particular a shoulder area of the tooth 9 including the shoulder 21 arranged within the shoulder area. The shoulder 21, in particular the shoulder area, and the tooth flank area 15 together form the tooth head of the tooth 9.

Over a body length along the longitudinal axis 11 of the tooth 9, the tooth body 19 has an at least substantially constant cross-section. The tooth body 19 is in contact with the guide 7 of the tooth carrier 5. Via the contact surfaces, contact lines or contact points, forces can be transmitted between the tooth 9 and the tooth carrier 5, for example, by lever action.

The tooth flank area 15 comprises tooth flanks 17, which can get into contact with the tooth system 3. Via the tooth flanks 17, forces can be transmitted between the tooth system 3 and the tooth 9.

Between the tooth body 19 and the tooth flanks 17 of the tooth flank area 15, one shoulder 21 respectively projects back from the tooth body 19 to the inside towards the tooth flanks 17. The shoulder 21 and the tooth flank area 15 commonly have an axial length, which is larger than a depth of a tooth gap 29 of the tooth system 3. The shoulder 21 may in particular serve as an extension of the body length of the tooth body 19 up to an edge 31 at the border between the tooth body 19 and the shoulder 21. In particular, lever actions in transmitting forces between a tooth 9 and the tooth carrier 5 can be improved, for example, by a tooth guiding contact between the tooth body 19 and the guide 7, which contact is shifted far towards the tooth system 3.

FIG. 2 schematically shows a view of a tooth 9 of a typical embodiment, wherein the view plane is perpendicular to tooth flanks 17 of a tooth flank area 15 of the tooth 9. The tooth flank area 15 is the axial area along the longitudinal axis 11 of the tooth 9, in which the tooth flanks 17 and a tooth tip of the tooth 9 are arranged. Between the tooth flank area 15 and a tooth body 19 of the tooth 9, the tooth 9 respectively comprises a shoulder 21 projecting back from the tooth body 19 to the tooth flanks 15. The shoulder 21 is arranged in a shoulder area 20 of the tooth 9. In an inlet area, the tooth body 19 comprises a cone 45, which extends in an axial direction relative to the longitudinal axis 11 of the tooth 9 from the tooth body, in particular from an edge 52, towards the tooth tip and is adjacent to the shoulder 21. The cone 45 has an angle of 2° relative to the longitudinal axis 11 of the tooth 9. The transition between the cone 45 of the tooth 9 and the cylindrical part of the tooth body 19 is formed to be crowned. As shown in FIG. 3, conical surfaces of the cone 45 partially extend into the shoulder area 20 and into the tooth flank area 15 of the tooth 9, in particular into parts of the tooth 9, in which neither a shoulder 21 nor a tooth flank 17 is provided.

In FIG. 2, a flank line 41 to a tooth flank 17 is plotted, which flank line in FIG. 2 corresponds, for example, to a medial tangent to the tooth flank 17 in a sectional plane of the tooth 9. The flank line 41 intersects a volume of the tooth body 19. The flank line 41 encloses a flank angle 42 with the longitudinal axis 11. In a first point 49, for example, at or near the edge 31, the shoulder 21 is more inclined towards the longitudinal axis 11 than the tooth flank 17. The inclination of the shoulder 21 to the longitudinal axis is in the first point 42 in particular larger than the flank angle 42. In FIG. 2, the shoulder 21 is rounded with a radius. The shoulder 21 is less finely machined than the tooth flank 17.

FIG. 3 schematically shows a side view of the tooth 9, wherein the view plane of the side view is perpendicular to the view plane of FIG. 2. FIG. 3 shows the shoulder 21 and the tooth flank area 15 having tooth flanks 17, wherein a tooth head 43 of the tooth, which comprises the shoulder 21 and the tooth flank area 15, has an axial length which is larger than a depth of a tooth gap of a tooth system in a typical gearing. The tooth 9 having the tooth flank area 15 may in particular plunge completely into the tooth system without the shoulder 21 getting into contact with the tooth system.

FIG. 4 schematically shows a view of a tooth 9 of a further typical embodiment, wherein the view plane is perpendicular to tooth flanks 17 of a tooth flank area 15 of the tooth 9. In FIG. 4, a shoulder 21 is rounded concavely towards the tooth flank 17, for example, rounded concavely to the inside towards the longitudinal axis 11. The shoulder 21 has a retraction 47 towards the inside with respect to a tooth flank 17 or a flank line 41. The retraction of the shoulder 21 in a first point 49 near the transition to a tooth body 19 of the tooth 9 is in particular more inclined to the longitudinal axis 11 than the tooth flank 17, in particular with an inclination which is larger than the flank angle 42. The retraction 47 of the shoulder 21 in a second point 51 near the transition to a tooth flank 17 of the tooth flank area 15 of the tooth 9 is less inclined to the longitudinal axis 11 than the tooth flank 17, in particular with an inclination which is smaller than the flank angle 42.

FIG. 5 schematically shows a side view of the tooth 9, wherein the view plane of the side view is perpendicular to the view plane of FIG. 4. In FIGS. 4 and 5, the shoulder 21, in particular the retraction 47, is less finely machined than the tooth flank 17. Due to the retraction 47 of the shoulder 21, the tooth flanks 17, for example, may be reduced to those surfaces which are required for transmitting forces between a tooth system of a hollow wheel and the tooth flank area 15 of the tooth 9. By the retraction 47 and the downsizing of the flank surfaces, splash losses can be reduced which might occur due to lubricating oil between a tooth and a tooth system being displaced.

The invention is not restricted to the embodiment described above, the scope of the invention is rather defined by the attached claims.

The invention claimed is:

1. A gearing comprising
a tooth system,
a tooth carrier having guides,
teeth received within the guides for engagement with the tooth system, wherein the teeth are mounted within the guides to be displaceable in the direction of their longitudinal axis relative to the tooth carrier,
a cam disk for driving the teeth along the respective longitudinal axis of the teeth,
wherein at least one of the teeth respectively has a tooth flank area having tooth flanks, and a tooth body, and
wherein, between the tooth body and the tooth flanks, one shoulder respectively is provided, which projects back from the tooth body to an inside towards the tooth flank.

2. The gearing according to claim 1, wherein in a view plane extending along the longitudinal axis of the tooth and perpendicular to the tooth flanks, a tangent to one of the tooth flanks intersects a volume of the tooth body.

3. The gearing according to claim 1, wherein the tooth body at least substantially is cylindrical.

4. The gearing according to claim 1, wherein the tooth flanks encloses a flank angle with the longitudinal axis, and wherein the flank angle is at least 15° and/or at maximum 45°.

5. The gearing according to claim 1, wherein at the transition to the tooth flanks, the shoulder is respectively rounded towards the inside.

6. The gearing according to claim 1, wherein the tooth flank area and the shoulder commonly have an axial length which is larger than a depth of a tooth gap of the tooth system.

7. The gearing according to claim 1, wherein the tooth body has a cone in an inlet area and wherein a tangent to the outer circumference of the cone encloses a cone angle of a maximum of 2° with the longitudinal axis of the tooth.

8. The gearing according to claim 1, wherein the surface of the tooth at the shoulder is differently machined from the tooth flanks.

9. The gearing according to claim 1, wherein the guides of the tooth carrier are radially oriented with respect to the rotational axis of the cam disk and wherein the teeth are mounted to be radially displaceable within the guides of the tooth guide with respect to the rotational axis of the cam disk.

10. The gearing according to claim 1, wherein the guides of the tooth carrier are axially oriented with respect to the rotational axis of the cam disk and wherein the teeth are mounted to be axially displaceable within the guides of the tooth carrier with respect to the rotational axis of the cam disk.

11. Use of a gearing according to claim 1.

12. A tooth for a gearing according to claim 1, wherein the tooth has the tooth flank area having the tooth flanks, and the tooth body, wherein, between the tooth body and the tooth flanks, one shoulder respectively is provided, which projects back from the tooth body to the inside towards the tooth flank.

13. The gearing according to claim 5, wherein the shoulder is shaped to be concave.

14. The gearing according to claim 7, wherein the tooth body has the cone in the inlet area adjacent to the shoulder.

* * * * *